(12) United States Patent
Boucher et al.

(10) Patent No.: US 7,558,935 B1
(45) Date of Patent: Jul. 7, 2009

(54) METHOD AND SYSTEM FOR OPTIMIZING MEMORY ALLOCATION

(75) Inventors: Michael L. Boucher, Lafayette, CO (US); Lawrence A. Crowl, Mountain View, CA (US); Terrence C. Miller, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 761 days.

(21) Appl. No.: 10/838,603

(22) Filed: May 4, 2004

(51) Int. Cl.
*G06F 12/02* (2006.01)
(52) U.S. Cl. .................... 711/170; 711/132; 711/173
(58) Field of Classification Search ............. 711/132, 711/170, 173
See application file for complete search history.

(56) References Cited

U.S. PATENT DOCUMENTS

| 5,347,652 A * | 9/1994 | Epstein et al. ............. 707/1 |
|---|---|---|
| 6,173,421 B1 * | 1/2001 | Weaver Johnson et al. .... 714/38 |
| 2001/0044856 A1 * | 11/2001 | Agesen et al. .............. 709/315 |

OTHER PUBLICATIONS

Choi, Jong-Deok. "Escape Analysis for Java". Nov. 1, 1999. pp. 1-19.*

* cited by examiner

*Primary Examiner*—Sanjiv Shah
*Assistant Examiner*—Jae U Yu
(74) *Attorney, Agent, or Firm*—Sonnenschein Nath & Rosenthal LLP

(57) ABSTRACT

Methods, systems, and articles of manufacture consistent with the present invention optimize allocation of items to a stack memory instead of a heap memory. It is determined whether an item to be placed on the heap memory escapes from the scope of the item's allocator, and whether the item survives the item's allocator. The item is allocated to the stack memory responsive to the item not escaping from the scope of the item's allocator and not surviving the item's allocator.

18 Claims, 5 Drawing Sheets

METHOD AND SYSTEM FOR OPTIMIZING MEMORY ALLOCATION

FIELD OF THE INVENTION

The present invention relates generally to allocating memory in a data processing system and, more particularly, to methods and systems for optimizing use of a stack memory over a heap memory.

BACKGROUND OF THE INVENTION

It is often necessary for computer programs to dynamically allocate memory during the execution of an algorithm. In many cases, the memory is allocated from either the stack or the heap. As is known, a stack or stack frame is a temporary memory allocation that is set up by a memory allocator (for example, by a function when the function is called) and lasts as long as the allocator of the stack. The allocator can use the stack to temporarily hold objects, including local variables and arguments, for as long as the allocator exists. Objects that are allocated to the stack typically are deallocated on or before deallocation of the stack. If an object in the stack is not deallocated along with the stack, then there is considered to be a memory leak. Memory allocators include, but are not limited to, function prologues and constructors. Memory deallocators include, but are not limited to, function epilogues and destructors.

Since objects allocated to the stack typically are deallocated with the stack, those objects preferably should be limited to the scope of their allocators and the stack. For example, an object should be local to its allocator and not global, otherwise a problem may occur when the object is deallocated along with the stack. When objects are global or are desired to exist for a long period of time, those objects typically are allocated to the heap instead of the stack. The heap is reserved for the memory allocation requirements of the computer program, and is separate from the stack. Unlike the stack, the heap's lifetime is not limited to the lifetime of an allocator.

As stack allocation is faster than heap allocation, it may be desirable to use stack allocation instead of heap allocation; however, computer programs typically cannot determine the lifetime of an object to be allocated to memory. Therefore, computer programs typically default the object's allocation to the heap. Further, computer programs and programming languages typically lack mechanisms for specifying stack allocation instead of heap allocation, and also typically lack mechanisms for specifying an allocation that uses the stack when possible and uses the heap otherwise. Accordingly, memory allocation to the stack typically is not optimized, resulting in low computing efficiency.

SUMMARY OF THE INVENTION

Methods, systems, and articles of manufacture consistent with the present invention improve computing efficiency by dynamically optimizing memory allocation of items to the stack instead of the heap. During a source code compilation or during execution of an object code, the program identifies memory allocation instructions for allocating items to the heap and determines whether to instead allocate the items to the stack. If an item to be placed on the heap does not exit the scope of its allocator and does not survive its allocator, then the item is allocated to the stack instead of the heap. Accordingly, the memory allocation for the item is optimized, because processing items on the stack generally is faster than processing items on the heap. Thus, methods, systems, and articles of manufacture provide optimized memory allocation compared to conventional approaches, which typically default allocation of items to the heap.

In accordance with methods consistent with the present invention, a method in a data processing system for optimizing memory allocation to a stack memory instead of a heap memory is provided. The method comprises the steps of: determining whether an item to be placed on the heap memory escapes from the scope of the item's allocator; determining whether the item survives the item's allocator; and allocating the item to the stack memory responsive to the item not escaping from the scope of its allocator and not surviving its allocator.

In accordance with articles of manufacture consistent with the present invention, a computer-readable medium containing instructions that cause a data processing system to perform a method for optimizing memory allocation to a stack memory instead of a heap memory is provided. The method comprises the steps of: determining whether an item to be placed on the heap memory escapes from the scope of the item's allocator; determining whether the item survives the item's allocator; and allocating the item to the stack memory responsive to the item not escaping from the scope of the item's allocator and not surviving the item's allocator.

In accordance with systems consistent with the present invention, a data processing system for optimizing memory allocation to a stack memory instead of a heap memory is provided. The data processing system comprises: a memory having a program that determines whether an item to be placed on the heap memory escapes from the scope of the item's allocator, determines whether the item survives the item's allocator, and allocates the item to the stack memory responsive to the item not escaping from the scope of the item's allocator and not surviving the item's allocator; and a processing unit that runs the program.

In accordance with systems consistent with the present invention, a data processing system for optimizing memory allocation to a stack memory instead of a heap memory is provided. The data processing system comprises: means for determining whether an item to be placed on the heap memory escapes from the scope of the item's allocator; means for determining whether the item survives the item's allocator; and means for allocating the item to the stack memory responsive to the item not escaping from the scope of the item's allocator and not surviving the item's allocator.

Other features of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Reference will now be made in detail to an implementation in accordance with methods, systems, and articles of manufacture consistent with the present invention as illustrated in the accompanying drawings. Wherever possible, the same reference numbers will be used throughout the drawings and the following description to refer to the same or like parts.

Methods, systems, and articles of manufacture consistent with the present invention improve computing efficiency by dynamically optimizing memory allocation of items to the stack instead of the heap. During a source code compilation or during execution of an object code, the program identifies memory allocation instructions for allocating items to the heap and determines whether to instead allocate the items to the stack. If an item to be placed on the heap does not exit the scope of its allocator and does not survive its allocator, then the item is allocated to the stack instead of the heap by changing the heap memory allocation instruction to a stack memory allocation instruction. Accordingly, the memory allocation for the item is optimized, because processing items on the stack is generally faster than processing items on the heap.

Figure 1:
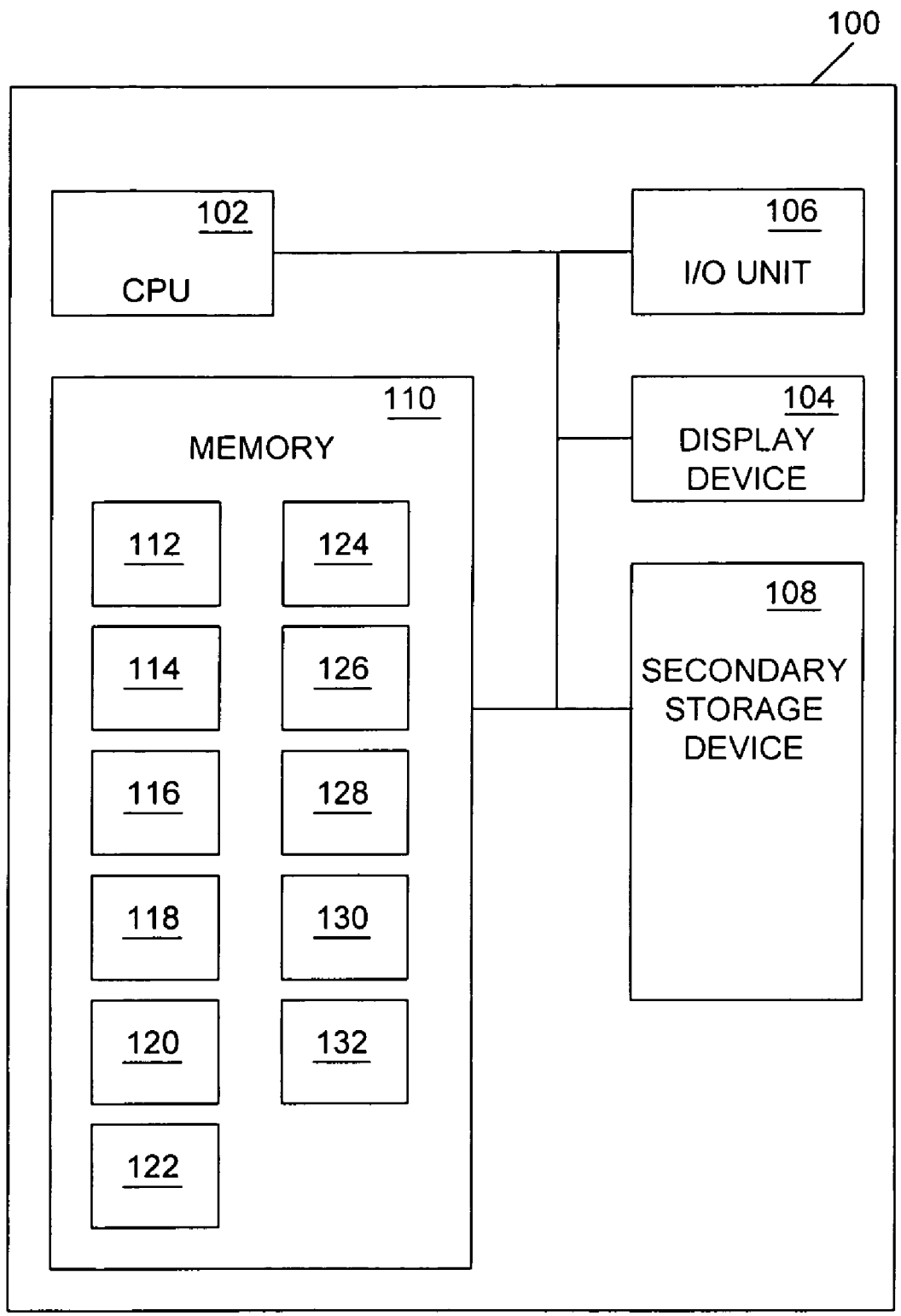
FIG. 1 depicts a block diagram of a data processing system consistent with the present invention.

FIG. 1 depicts a block diagram of a data processing system 100 suitable for optimizing memory allocation consistent with the present invention. As shown, data processing system 100 comprises a central processing unit (CPU) 102, a display device 104, an input/output (I/O) unit 106, a secondary storage device 108, and a memory 110. The data processing system may further comprise standard input devices such as a keyboard, a mouse or a speech-processing means (each not illustrated).

Memory 110 comprises a program 112 that effects optimizing memory allocation during a compile-related processing of a source code 114 or during run time of an object code 116. Program 112 can be implemented as a stand-alone program or module or as part of another program or module, such as a pre-compiler optimizer, a compiler, a post-compiler optimizer, a linker, a loader, or another program or module associated with the compilation process. As will be described in more detail below, the program 112 identifies memory allocation instructions for allocating items to the heap and determines whether to instead allocate the items to the stack. The items are, for example, objects, variables, pointers, or other items. If an item to be placed on the heap does not exit the scope of its allocator and does not survive its allocator, then the item is allocated to the stack instead of the heap by changing the heap memory allocation instruction to a stack memory allocation instruction. The stack 118 and the heap 120 also are depicted in the memory.

One having skill in the art will appreciate that program 112 can reside in a memory on a system other than data processing system 100. Program 112 may comprise or may be included in one or more code sections containing instructions for performing their respective operations. While program 112 is described as being implemented as software, the present implementation may be implemented as a combination of hardware and software or hardware alone.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system 100 have been described, one having skill in the art will appreciate that a data processing system suitable for use with methods, systems, and articles of manufacture consistent with the present invention may contain additional or different components.

Figure 2:
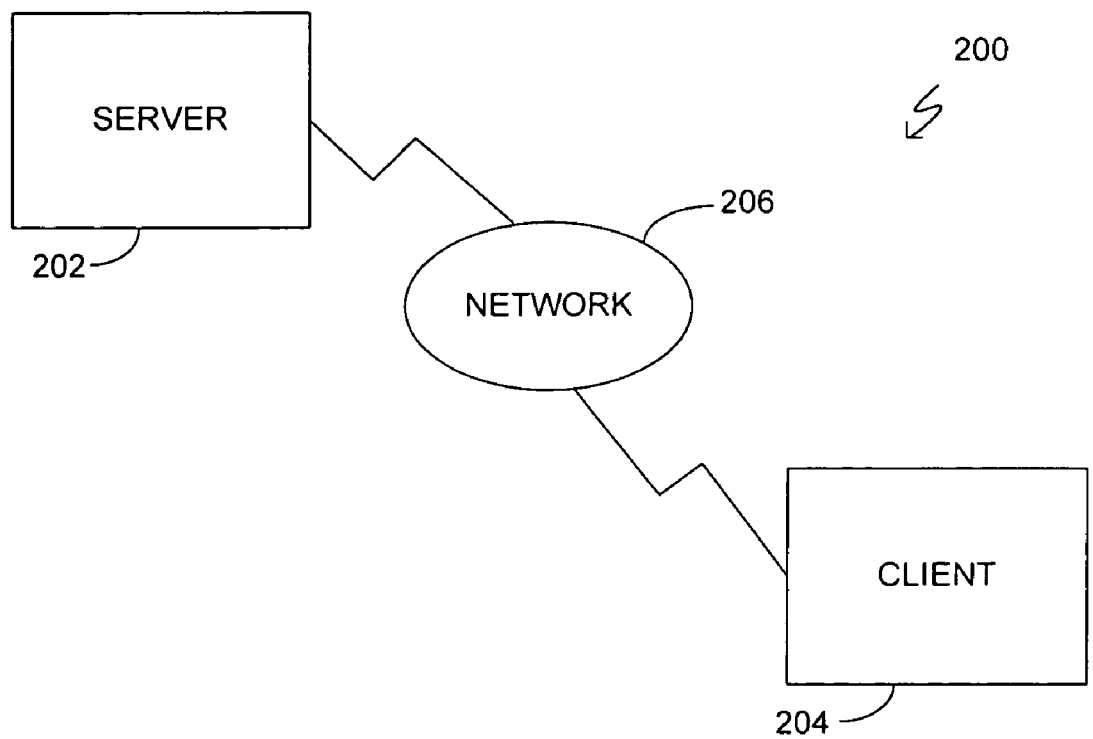
FIG. 2 shows a block chart of a client-server data processing system consistent with the present invention.

Data processing system 100 also may be implemented in a client-server environment, like the one shown in FIG. 2. FIG. 2 depicts a block diagram of a client-server data processing system 200. A server 202 and a client 204 are each connected to a network 206, such as a Local Area Network, Wide Area Network, or the Internet. At least a portion of, for example, the program can be stored on the client, while some or all steps of the processing can be carried out on the server, which is accessed by the client via the network. The client and server each can comprise components similar to those described above with respect to data processing system 100, such as a CPU, an I/O unit, a memory, a secondary storage device, and a display device.

Figure 3:
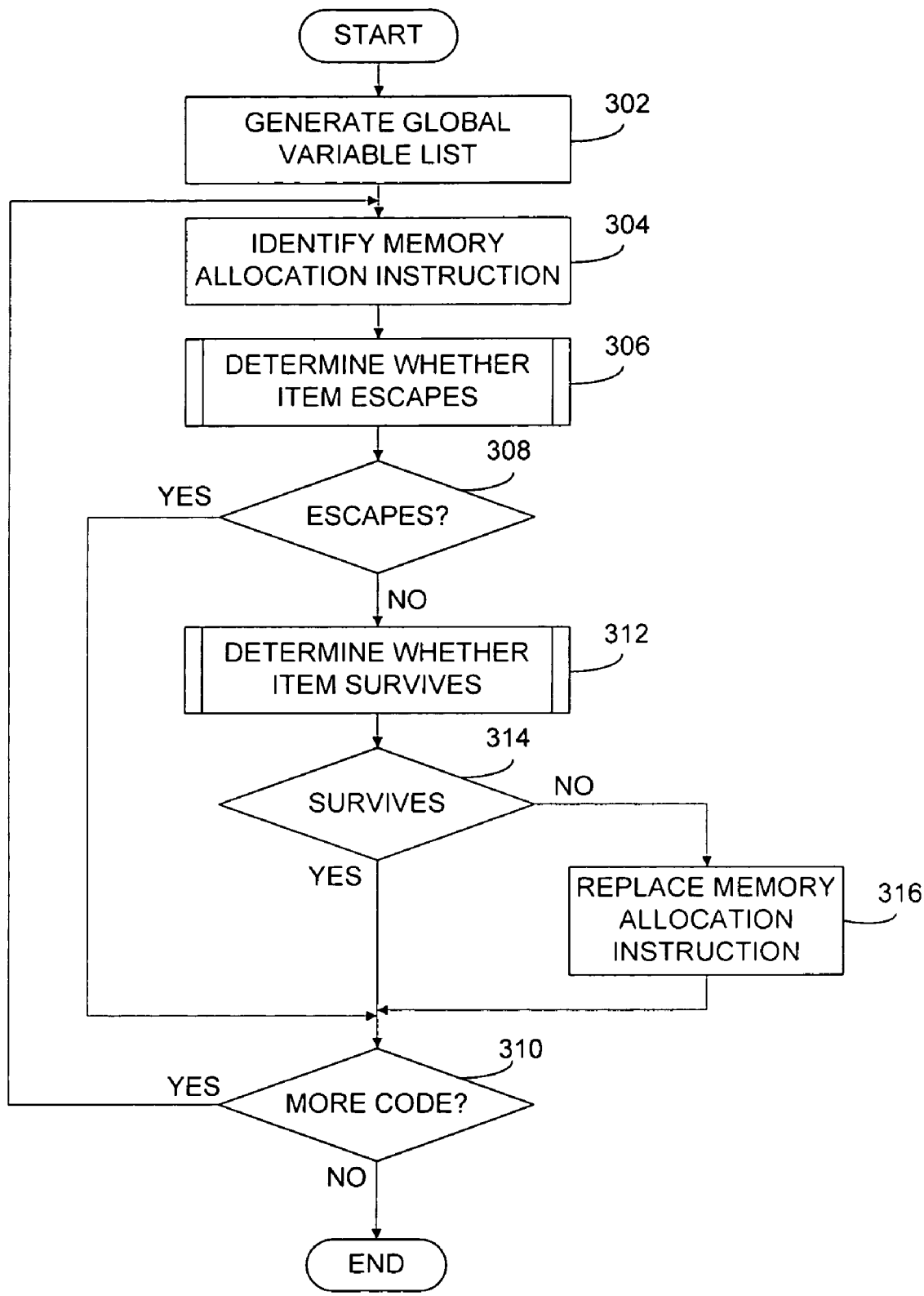
FIG. 3 depicts a flow chart of the exemplary steps performed by the program consistent with the present invention.

FIG. 3 depicts a flow chart illustrating the exemplary steps performed by the main program for optimizing memory allocation. As described above, the program can optimize memory allocation in a compile-related processing or at run time. As an illustrative example, the exemplary steps performed by the program will be described below with reference to compiling source code 114 into object code 116. The illustrative source code is shown below:

```
int *global_pointer; /* Global variable */
int *func1(int **escape_argument) {
    int *does_not_escape;
    int *escapes_by_copy, *escapes_by_return;
    int *may_escape;
    does_not_escape = malloc(100);   /* This is a local variable, never
                                        passed anywhere, copied, or
                                        pointed to */
    escapes_by_copy = malloc(200);
    global_pointer = escapes_by_copy;   /* Value now available
                                           everywhere. */
    escapes_by_return = malloc(400);
    may_escape = malloc(800);
    func2(may_escape);   /* func2 may copy may_escape into a global
                            variable, which would allow may_escape to
                            escape. Having no evidence to the contrary,
                            the program assumes that may_escape does
                            escape. */
    free(does_not_escape);
    return (escapes_by_return);   /* The return statement passes
                                     escapes_by_return out of scope. */
}
```

Although the illustrative source code is implemented in the C programming language, one having skill in the art will appreciate that the source code is not limited thereto and can be implemented in another programming language. Further, the illustrative source code is merely illustrative and methods, systems and articles of manufacture consistent with the present invention are not limited thereto. As shown above, the illustrative source code includes several "malloc" instructions, which are C instructions for allocating memory to the heap. For example, the "does_not_escape=malloc(100)" code assigns the variable "does_not_escape" to the heap. Alternative memory allocation instructions including instructions that allocate memory as part of other tasks such as object allocation can be analyzed by the program.

As will be described in more detail below, the program makes a compile-time or run-time determination of whether the memory allocation request can be optimized by allocating stack memory instead of heap memory when the memory allocation instruction, such as the "malloc" function in the illustrative source code, is encountered. If the memory allocation can be optimized by placing an item on the stack instead of the heap, then the program, for example, modifies the source code to change the heap memory allocation instruction to a stack memory allocation instruction. For example, in the illustrative C source code, the program changes the "malloc" function to an "alloca" instruction (not shown in illustrative example), which is a C function for allocating stack memory. The program is not limited to optimizing memory allocations for "malloc" functions, and can optimize memory allocations for other commands, functions, routines and instructions, for example, that request allocation of items to the stack or the heap.

As shown in FIG. 3, initially the program generates a list of global variables that are present in the source code or object code (step 302). This is done by analyzing the lines of source code or object code (for example, from the beginning of the source code or object code to the end) and identifying definitions of global variables. When a line of source code or object code contains a definition of a global variable, the global variable name is added to a global variable list 122. In the illustrative example, the program identifies the global variable named "global_pointer" in the source code and adds the name "global_pointer" to the global variable list.

Then, the program identifies a memory allocation instruction for allocating an item to the heap (step 304). This is done by identifying, for example, a command, function, routine or other instruction in the source code or in the object code that requests a memory allocation. The program analyzes the instructions in a line of the source code that is to be compiled and compares the instructions in the line of source code to an instruction list 124 of known memory allocation instructions. If an instruction in the line of source code corresponds to an instruction in the instruction list 124, then the program proceeds to determine whether the memory allocation instruction can be optimized. In the case of analyzing the object code at run time, the program analyzes the instructions in a line of the object code that appears in the object code program flow. If an instruction in the line of object code corresponds to an instruction in the instruction list 124, then the program determines whether to optimize that memory allocation instruction. In the illustrative example, the program identifies an instruction to assign a variable to the heap (e.g., "does_not_escape=malloc(100)") during compilation of a line of the source code.

When the program identifies a memory allocation instruction in step 304, the program determines whether the item to be allocated to memory or a copy of the item escapes the scope of the item's allocator (step 306). For example, if the stack is allocated to accommodate the local variables for a function, and the function contains a memory allocation instruction to place a variable on the stack, the variable escapes the scope of the function, for example, when the variable or a copy of the variable is visible outside of the function (e.g., the variable is used outside the function or the variable is copied by a global variable) or when the variable or a copy of the variable is passed as a term of the function's exit instruction (e.g., the "return (variable)" instruction in the C++ programming language). Step 306 of the flow chart of FIG. 3 is described in more detail below with reference to FIG. 4.

Figure 4:
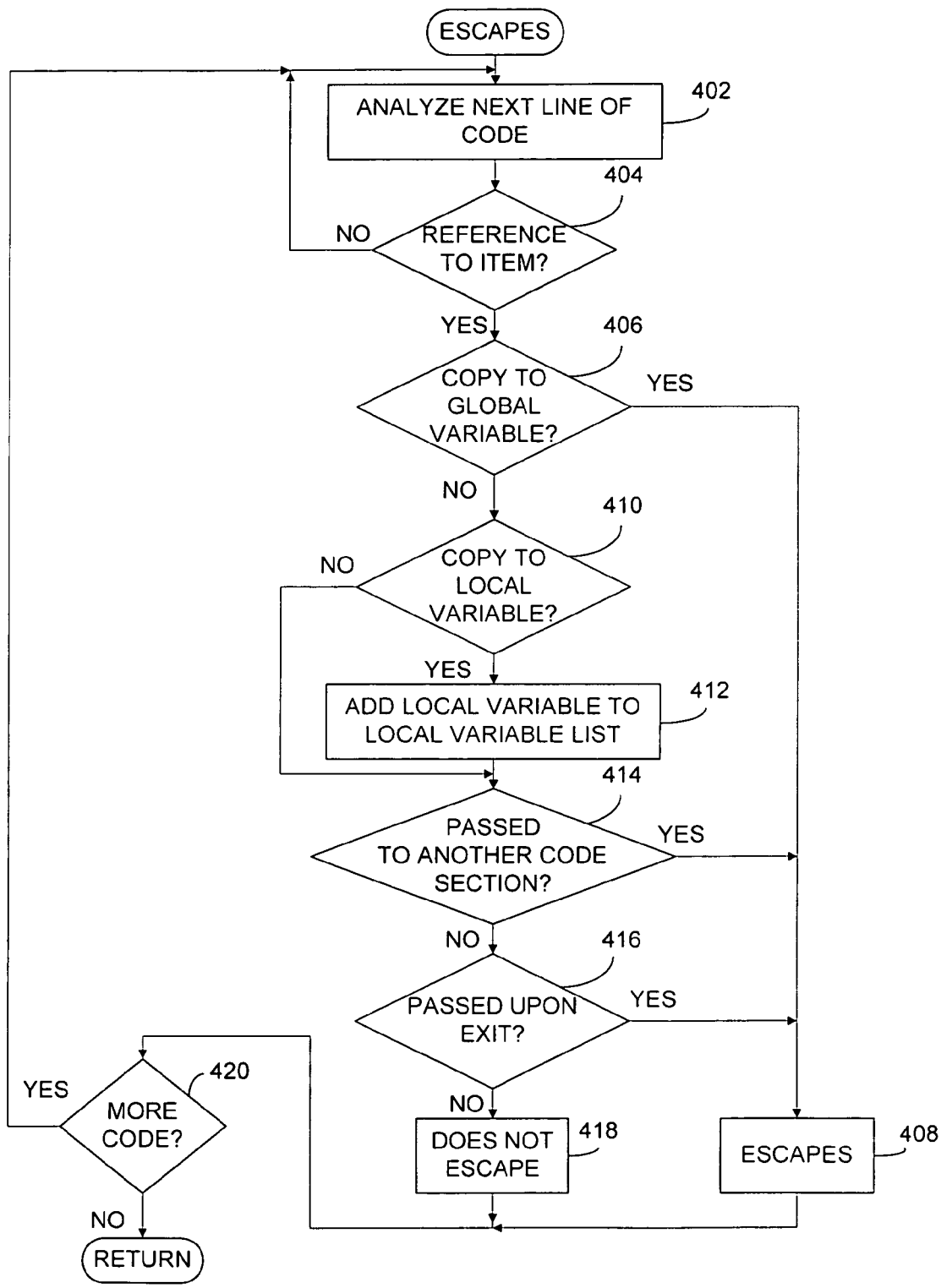
FIG. 4 depicts a flow chart of the exemplary steps performed by the program for determining whether an item escapes.

Referring to FIG. 4, to determine whether the item to be allocated to memory or a copy of the item escapes the scope of the item's allocator, the program analyzes each line of source code or object code of the item's allocator for references to the item. In the illustrative example, the item is allocated by function "func1." The program therefore analyzes each line of function "func1" for references to the item. As shown in FIG. 4, the program identifies the next line of source code or object code of the allocator, starting with the first line of code of the allocator (step 402) and determines whether there is a reference to the item or a copy of the item in that line of code (step 404). As the program analyzes the lines of code, if the program determines that the item is copied or pointed to by another local variable, then the program adds the local variable to a local variable list 126 (see step 412). In step 404, the program looks for the name of the item or the names of items that appear in the local variable list in the line of code. If there is no reference to the item, a copy of the item, or a pointer to the item in step 404, then the program returns to step 402 to look at the next line of code.

If there is a reference to the item, a copy of the item, or a pointer to the item in the line of code in step 404, then the program determines whether the item is copied to or pointed to by a global variable (step 406). In the illustrative example, the program would determine that the local variable "escapes_by_copy" is copied by the global variable "global_pointer" in the instruction "global_pointer=escapes_by_copy." If the item is copied to or pointed to by a global variable in step 406, then the program determines that the item escapes the scope of the allocator and identifies the item as being able to escape, for example by setting a flag that indicates that the item escapes (step 408). If the item is not copied to or pointed to by a global variable in step 406, then the program determines whether the item is copied to or pointed to by a local variable (step 410). For example, as shown in the illustrative example, the program would determine that the item on the heap is copied to a local variable in the instruction "escapes_by_copy=malloc(200)." If the item is copied to or pointed to by a local variable, then the program adds the name of the local variable to a local variable list 126 (step 412).

If the item is not copied to or pointed to by a local variable in step 410 or after updating the local variable list in step 412, the program then determines whether the item, a copy of the item, or a pointer to the item is passed as an argument to another code section (step 414). For example, the item may be passed as an argument within a function call, procedure call, or subroutine. In the illustrative example, the instruction "func2(may_escape)" includes the function call for "func2" with local variable "may_escape" as an argument. Since "func2" may copy "may_escape" into a global variable, which would allow "may_escape" to escape, the program assumes that "may_escape" does escape when used within "func2." Therefore, when the program determines that the item or a reference to the item is passed as an argument to another code section in step 414, the program's execution proceeds to step 408 to identify the item as being able to escape. Alternatively, the program can analyze the lines of code in "func2" to determine whether the item escapes while used in "func2."

If the program determines that the item or a reference to the item is not passed as an argument to another code section in step 414, then the program determines whether the item, a copy of the item, or a pointer to the item is passed as an argument upon exit of the allocator (step 416). For example, the item may pass as an argument in a "return" instruction. In the illustrative example, the local variable "escapes_by_return" is passed as an argument in the instruction "return (escapes_by_return)". Therefore, in the illustrative example, "escapes_by_return" would be recognized by the program as an item that escapes the scope of the stack. If the program determines that an item escapes as an argument upon exit of the allocator in step 416, then the program identifies the item as being able to escape in step 408.

However, if the item or a reference to the item is not passed as an argument upon exit of the allocator in step 416, then the program identifies the item as not being able to escape, for example by setting a flag indicating that the item does not escape (step 418). If the program determines in step 420 that there are additional lines of code to analyze for the allocator, then the program flow returns to step 402. Otherwise, the program flow proceed to step 308 of FIG. 3 to determine whether the item was determined to be able to escape, for example, by looking at the flag associated with the item that indicates whether the item is able to escape (step 308).

Referring back to FIG. 3, if the program determines that the item is able to escape in step 308, then the program maintains the memory allocation instruction as an instruction that allocates the item to the heap. In that case, as the item can or may escape the stack, the program does not attempt to optimize the memory allocation by converting the heap memory allocation instruction to a stack memory allocation instruction. Then, the program determines whether there are additional lines of source code or object code to analyze for memory allocation instructions (step 310). If there are additional lines of code, then the program looks to the next line of code and flow returns to step 304 to identify a memory allocation instruction.

Figure 5:
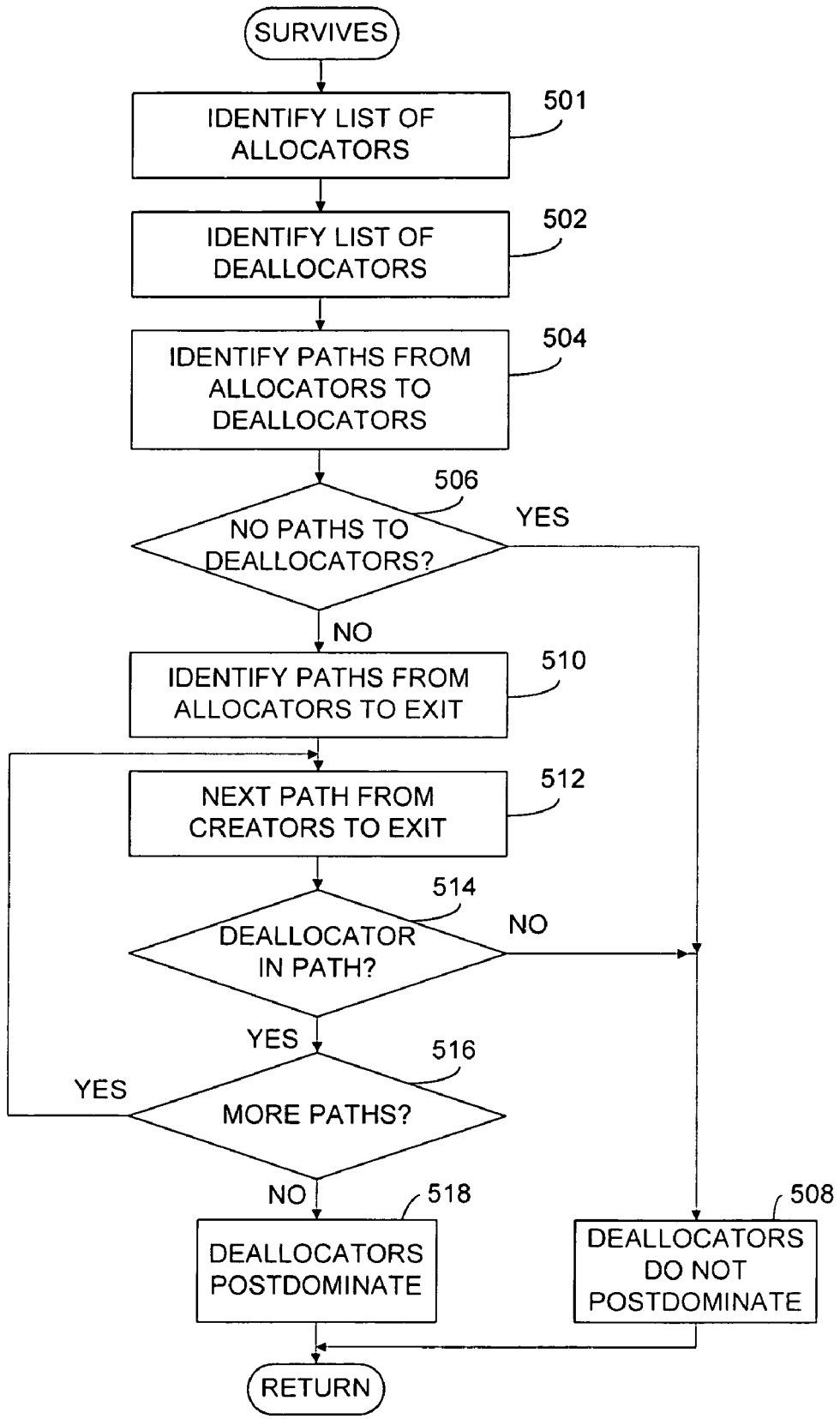
FIG. 5 shows a flow chart of the exemplary steps performed by the program for determining whether an item survives its allocator.

If the program determines in step 308 that the item is not able to escape, then the program further determines whether the item would survive its allocator (step 312), which would indicate a memory leak. One having skill in the art will appreciate that the determination of whether there is a memory leak can be performed prior to determining whether an item is able to escape. The program determines whether there is a memory leak by determining whether there is a path from the point at which an allocator allocates the item to an exit point from the allocator, which path does not include a deallocator of the item. If there is such a path, then the set of deallocators does not postdominate the allocator, and there could be a memory leak. Otherwise, the set of deallocators postdominates the allocator, allowing the item to be placed on the stack instead of the heap. FIG. 5 depicts step 312 of FIG. 3 in more detail.

In FIG. 5, the program identifies a set of allocators 128 associated with the item and their respective allocation points (step 501). The allocator allocates the item, for example, when the allocator is invoked in the source code or object code. The allocation and deallocation of heap items also may be done by user generated code, as can be done in the C++ programming language. Further, when the code is implemented in the C++ programming language, the allocation and deallocation of items to the heap may be hidden within the construction and destruction of stack items or other heap items. In the illustrative example, the function "func1" allocates an item when "func1" is invoked. The program identifies the allocation point of "func1" as the first line of "func1" in the source code or object code. A section of code, such as a section of code for another function, may make a copy of a pointer to the item. For example, in the illustrative example, "func2" (which is invoked by "func1") may make a copy of a pointer to the item. The program identifies these other code sections that make a copy of a pointer to the item as allocators. Accordingly, the program identifies the allocation points of those allocators as well.

Then, the program identifies a set of deallocators 130 of the item (step 502). A deallocator is something that deallocates the item from memory. For example, in the C programming language, when an object in a class is deallocated, a deallocator such as a destructor or function epilogue is called to remove the object from memory. The program looks to each line of the source code or object code associated with the set of allocators to identify the set of deallocators.

The program then identifies paths from the allocation points of the set of allocators to the points at which the deallocators are invoked (step 504). For purposes of this disclosure, when a path leads from an allocation point to a deallocator, the deallocator "postdominates" the allocator. If the program determines that there are no paths from an allocator to a deallocator (step 506), then the program identifies that the set of deallocators does not postdominate the set of allocators (step 508). As will be described below with reference to step 514, if the path from an allocator leads to an exit from the allocator without passing through a deallocator, then the set of deallocators also does not postdominate the set of allocators.

If at least one path leads from an allocator to a deallocator as determined in step 506, then the program identifies a list of paths 132 from the allocation points of the set of allocators to the points of exit from the allocators (step 510). A point of exit from an allocator is a point at which program execution exits from the allocator, such as at a "return" instruction in a function. Beginning with the first identified path from an allocator to an exit (step 512), the program determines whether the path encounters a deallocator prior to reaching the exit (step 514). If the path does not encounter a deallocator prior to reaching the exit in step 514, then there is memory leak and the program identifies that the set of deallocators does not postdominate the set of allocators in step 508.

However, if the currently analyzed path does encounter a deallocator prior to reaching the exit in step 514, then there is not a memory leak in that path and the program then determines whether there are additional paths to analyze (step 516). If there are additional paths to analyze, then the program flow returns to step 512 to analyze the next path from an allocator to an exit. If there are no additional paths to analyze, then the program identifies that the set of deallocators postdominates the set of allocators (step 518). In other words, the item does not survive its allocator and is therefore eligible to be placed on the stack instead of the heap.

Referring back to FIG. 3, if the program determines that the item does not survive its allocator (step 314), then the program replaces the heap memory allocation instruction in the source code or object code with a stack memory allocation instruction (step 316). In the illustrative example, the program replaces the "malloc(100)" instruction with an "alloca (100)" instruction (not shown in illustrative example). Accordingly, the memory allocation for the item is optimized by allocating the item to the stack, which generally is faster than the heap.

If the program determines that the item escapes the scope in step 308, that the item survives its allocator in step 314, or after the memory allocation instruction is replaced in step 316, then the program determines whether there are additional lines of source code or object code to analyze (step 310). If there are additional lines of code to analyze, then program looks to the next line of code and flow returns to step 304 to identify a memory allocation instruction, otherwise the program ends.

Therefore, methods, systems, and articles of manufacture consistent with the present invention improve computing efficiency by optimizing memory allocation of items to the stack instead of the heap. When a heap memory allocation instruction is identified, if the item to be placed on the heap does not exit the scope of its allocator and does not survive its allocator, the item is allocated to the stack. Accordingly, the memory allocation for the item is optimized, because processing items on the stack generally is faster than processing items on the heap. Thus, methods, systems, and articles of manufacture provide optimized memory allocation compared to conventional approaches, which typically default allocation of items to the heap.

One having skill in the art will appreciate that the processing steps described are merely illustrative. The processing steps may be performed in a different order than as depicted, and additional intervening steps also may be performed. For example, one having skill in the art will appreciate that alternative algorithms can be used to determine whether an item escapes or survives its allocator.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software, but the present implementation may be implemented as a combination of hardware and software or hardware alone. Further, the illustrative processing steps performed by the program can be executed in an different order than described above, and additional processing steps can be incorporated. The invention may be implemented with both object-oriented and non-object-oriented programming systems. The scope of the invention is defined by the claims and their equivalents.

What is claimed is:

1. A method in a data processing system for optimizing memory allocation to a stack memory instead of a heap memory, the method comprising the steps of:
   determining whether an item to be placed on the heap memory escapes from the scope of the item's allocator;
   determining whether the item survives the item's allocator; and
   allocating the item to the stack memory responsive to the item not escaping from the scope of the item's allocator and not surviving the item's allocator,
   wherein the item survives the item's allocator when a deallocator of the item does not postdominate the item's allocator and does not postdominate an allocator of a copy of a pointer to the item.

2. The method of claim 1, wherein the step of allocating the item to the stack memory comprises replacing a heap memory instruction for allocating the item to the heap with a stack memory instruction for allocating the item to the stack.

3. The method of claim 1, wherein the item to be placed on the heap memory escapes from the scope of the item's allocator when at least one of the item, a copy of the item, and a pointer to the item is copied to a global variable.

4. The method of claim 1, wherein the item to be placed on the heap memory escapes from the scope of the item's allocator when at least one of the item, a copy of the item, and a pointer to the item is passed as an argument to a code section located outside of the item's allocator.

5. The method of claim 1, wherein the item to be placed on the heap memory escapes from the scope of the item's allocator when at least one of the item, a copy of the item, and a pointer to the item is included as an argument upon exit of the item's allocator.

6. The method of claim 1, wherein the method is performed in relation to compiling a source code.

7. The method of claim 1, wherein the method is performed in relation to executing an object code.

8. A data processing system including a processor and memory which is configured to receive instructions from a computer-readable storage medium that cause a program running in the memory of the data processing system to perform a method for optimizing memory allocation to a stack memory instead of a heap memory, the method comprising the steps of:
   determining whether an item to be placed on the heap memory escapes from the scope of the item's allocator;
   determining whether the item survives the item's allocator; and
   allocating the item to the stack memory responsive to the item not escaping from the scope of the item's allocator and not surviving the item's allocator,
   wherein the item survives the item's allocator when a deallocator of the item does not postdominate the item's allocator and does not postdominate an allocator of a copy of a pointer to the item.

9. The data processing system of claim 8, wherein the step of allocating the item to the stack memory comprises replacing a heap memory instruction for allocating the item to the heap with a stack memory instruction for allocating the item to the stack.

10. The data processing system of claim 8, wherein the item to be placed on the heap memory escapes from the scope of the item's allocator when at least one of the item, a copy of the item, and a pointer to the item is copied to a global variable.

11. The data processing system of claim 8, wherein the item to be placed on the heap memory escapes from the scope of the item's allocator when at least one of the item, a copy of the item, and a pointer to the item is passed as an argument to a code section located outside of the item's allocator.

12. The data processing system of claim 8, wherein the item to be placed on the heap memory escapes from the scope of the item's allocator when at least one of the item, a copy of the item, and a pointer to the item is included as an argument upon exit of the item's allocator.

13. The data processing system of claim 8, wherein the method is performed in relation to compiling a source code.

14. The data processing system of claim 8, wherein the method is performed in relation to executing an object code.

15. A data processing system for optimizing memory allocation to a stack memory instead of a heap memory, the data processing system comprising:
   a memory having a program that determines whether an item to be placed on the heap memory escapes from the scope of the item's allocator, determines whether the item survives the item's allocator, and allocates the item to the stack memory responsive to the item not escaping from the scope of the item's allocator and not surviving the item's allocator; and
   a processing unit that runs the program,
   wherein the item survives the item's allocator when a deallocator of the item does not postdominate the item's allocator and does not postdominate an allocator of a copy of a pointer to the item.

16. The data processing system of claim 15, wherein the item is allocated to the stack memory in relation to compiling a source code.

17. The data processing system of claim 15, wherein the item is allocated to the stack memory in relation to executing an object code.

18. A data processing system for optimizing memory allocation to a stack memory instead of a heap memory, the data processing system comprising:

means for determining whether an item to be placed on the heap memory escapes from the scope of the item's allocator;

means for determining whether the item survives the item's allocator; and means for allocating the item to the stack memory responsive to the item not escaping from the scope of the item's allocator and not surviving the item's allocator, wherein the item survives the item's allocator when a deallocator of the item does not postdominate the item's allocator and does not postdominate an allocator of a copy of a pointer to the item.

* * * * *